Jan. 30, 1923.
F. MÜLLER.
METHOD OF MAKING MILLING CUTTERS.
ORIGINAL FILED SEPT. 11, 1919.
1,443,643
4 SHEETS-SHEET 1
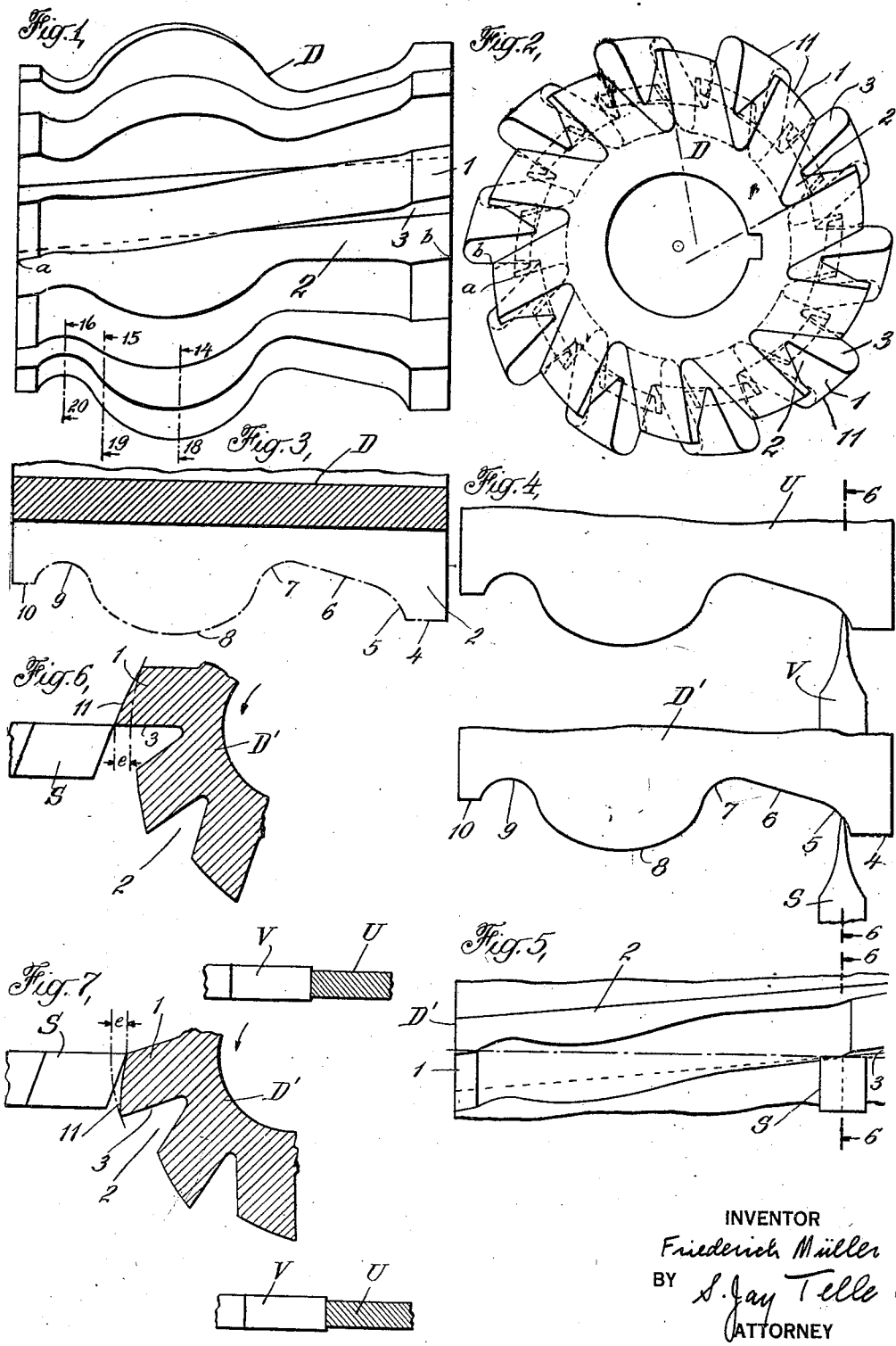
INVENTOR
Friederich Müller
BY S. Jay Telle
ATTORNEY Jan. 30, 1923.
F. MÜLLER.
METHOD OF MAKING MILLING CUTTERS.
ORIGINAL FILED SEPT. 11, 1919.
1,443,643
4 SHEETS-SHEET 2
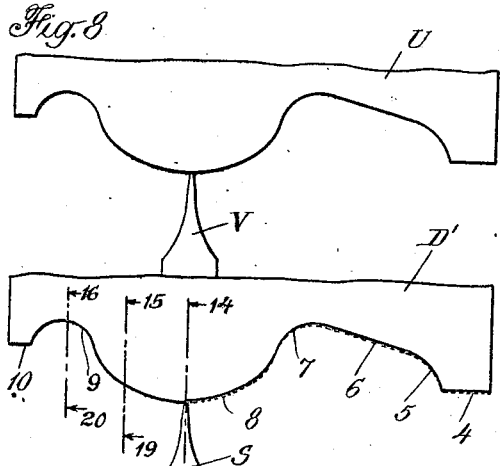
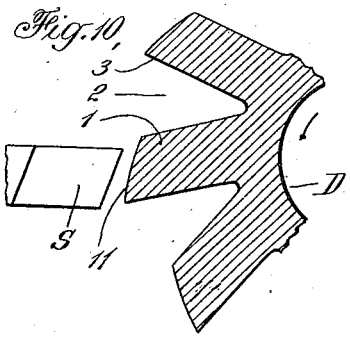
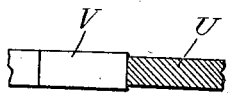
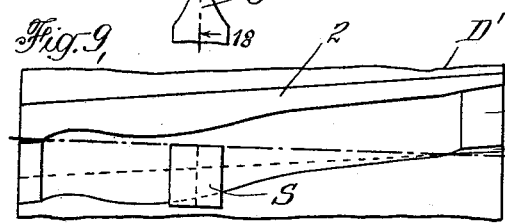
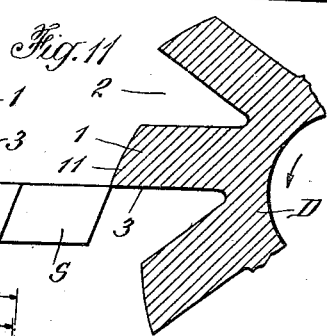
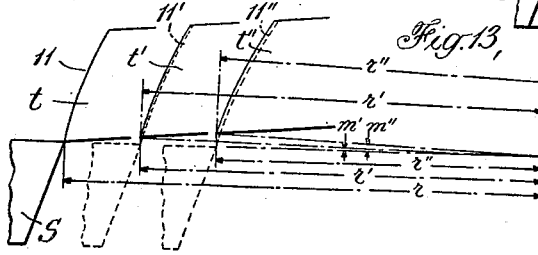
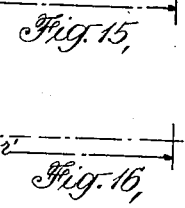
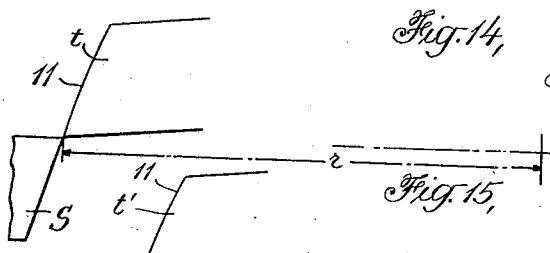
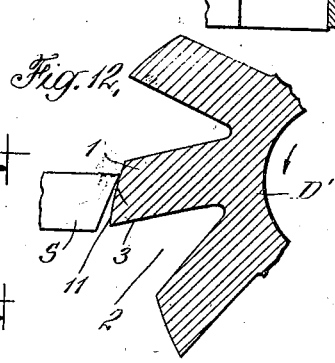
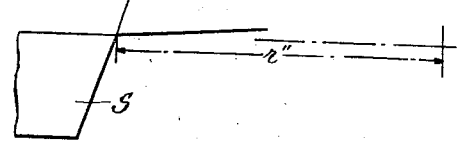
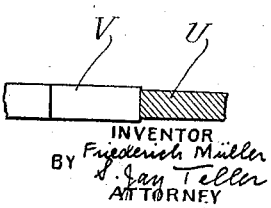
INVENTOR
Friederich Müller
BY
Jay Teller
ATTORNEY Jan. 30, 1923.
F. MÜLLER.
METHOD OF MAKING MILLING CUTTERS.
ORIGINAL FILED SEPT. 11, 1919.
1,443,643
4 SHEETS-SHEET 3
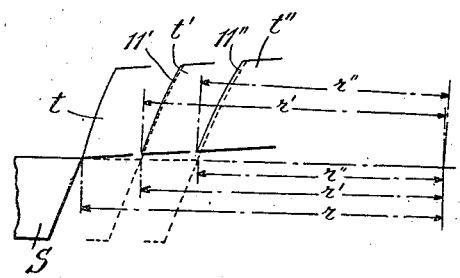
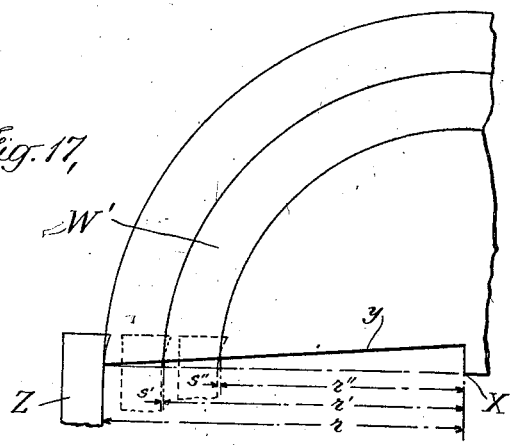
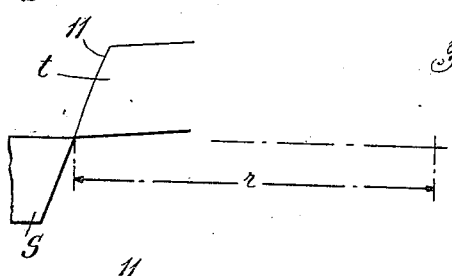
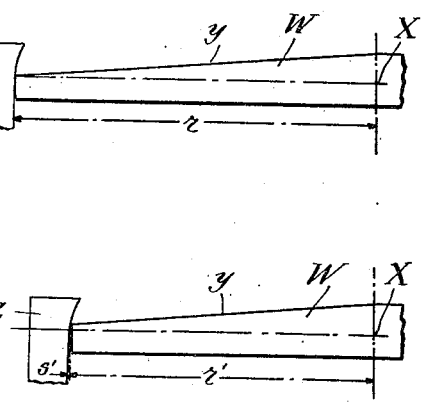
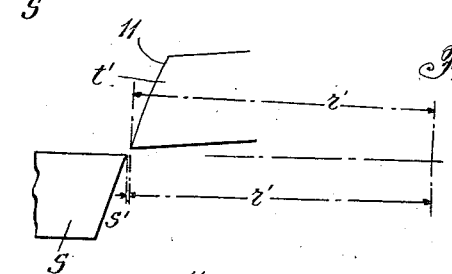
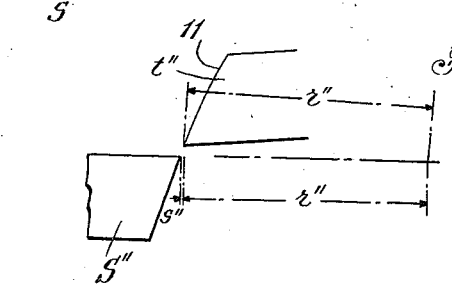
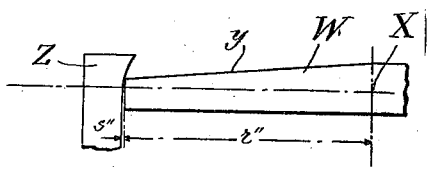
INVENTOR
Friederich Müller
BY S. Jay Teller
ATTORNEY

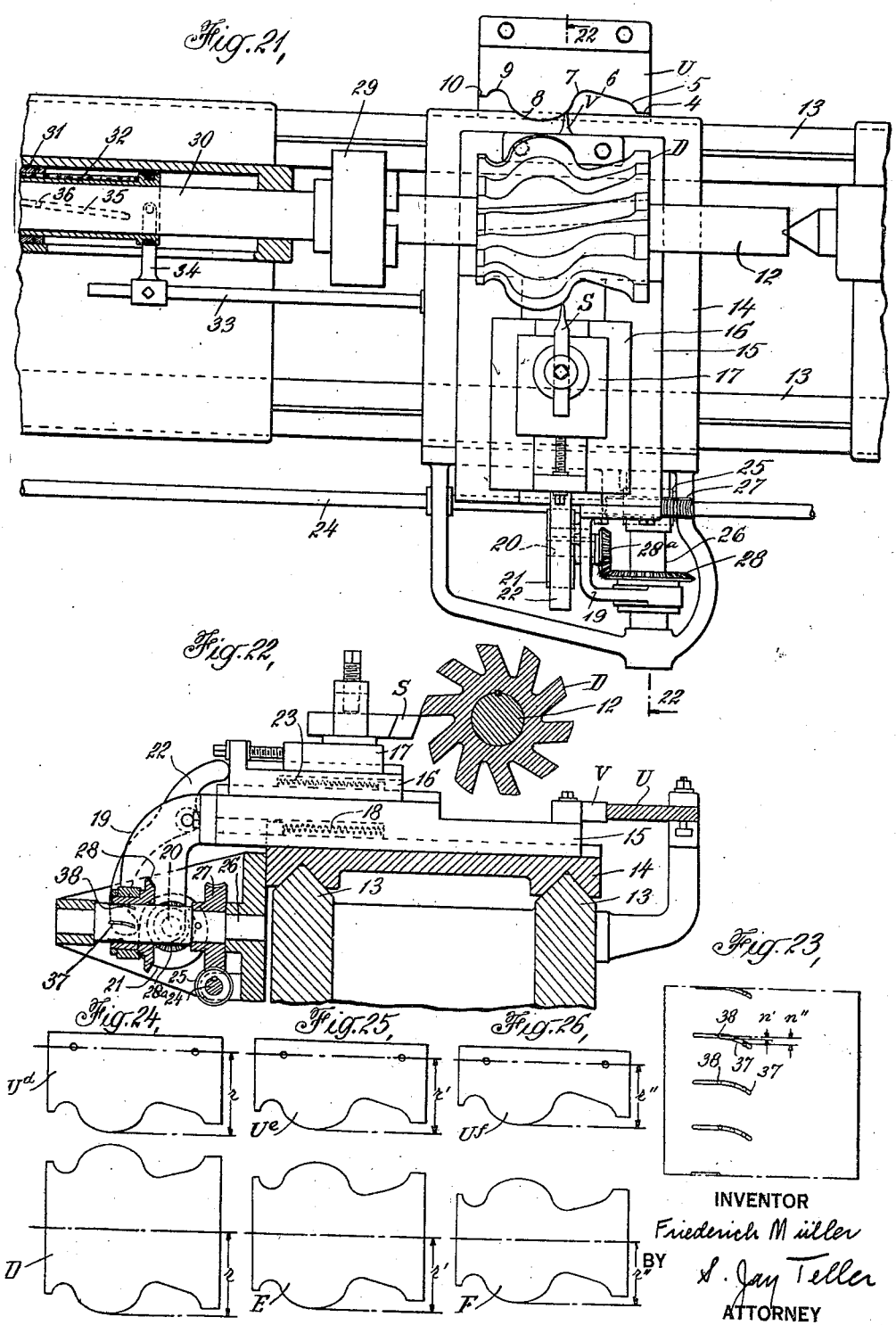

Patented Jan. 30, 1923.

1,443,643

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING CUTTERS.

Application filed September 11, 1919, Serial No. 323,112. Renewed March 24, 1922. Serial No. 546,522.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling Cutters, of which the following is a specification.

In the art of cutting metals it is preferable for many classes of work to incline the face of the cutting tool backward with respect to the direction of relative movement, thus forming a rake or undercut which provides a sharper cutting edge and enables other advantages to be attained. To a limited extent this principle has been applied to milling cutters, the cutting faces being inclined backward with respect to radial lines; but it has not heretofore been deemed possible to make milling cutters of this type which are adapted to accurately cut a predetermined contour differing from a straight line and which are so relieved that they can be ground on the cutting faces without changing the effective contour.

In accordance with the invention presented and claimed in my copending application for milling cutters, Serial No. 323,110, filed on even date herewith I have provided formed or contour cutters which are properly relieved and which have their cutting face non-radial so as to provide a rake or undercut. The cutting faces of a cutter embodying the invention set forth in the said application may be parallel with the axis or they may be inclined or helicoidal as set forth in my patent for milling cutters, No. 1,348,295, dated August 3rd, 1920.

The object of the present invention is to provide a method of making milling cutters of the type referred to. The cutters may have their cutting faces parallel with the axis or inclined as desired. When the cutting faces are inclined or helicoidal, as is preferred, the present method includes the method set forth in my patent for methods of making milling cutters, No. 1,348,301, dated August 3rd, 1920.

In order that the method may be clearly understood, I have shown in the accompanying drawings a cutter embodying the invention set forth in the aforesaid application Serial No. 323,110, and I have illustrated one way in which the method may be practiced. It will be understood, however, that the drawings are for illustrative purposes only and are not to be construed as defining or limiting the scope of the invention, the accompanying claims being relied upon for that purpose. It will be particularly understood that the contour of the cutter shown has been selected merely by way of example and that any practical contour may be substituted for that illustrated.

Of the drawings:

Figs. 1 and 2 are side and end views respectively of a cutter such as may be made in accordance with the invention.

Fig. 3 is a diagrammatic view showing the effective contour of the cutter shown in Figs. 1 and 2.

Fig. 4 is a diagrammatic view illustrating the method that is followed for cutting the required contour and relief on a cutter blank having no undercut. A cutting tool is shown in engagement with the blank.

Fig. 5 is a fragmentary front view of the elements shown in Fig. 4.

Fig. 6 is a diagrammatic sectional view taken along the lines 6—6 of Figs. 4 and 5.

Fig. 7 is a view similar to Fig. 6 but showing the cutter blank and the tool in different relative positions.

Figs. 8 and 9 are views similar respectively to Figs. 4 and 5 but showing the tool in a different position. Fig. 9 illustrates the difference in the relative position of the tool resulting from helicoidal cutting faces when such faces are provided.

Figs. 10, 11 and 12 are diagrammatic views similar to Figs. 6 and 7 and illustrating the relations between the blank and the tool, when the tool is in the general position indicated in Figs. 8 and 9.

Fig. 13 is a diagrammatic view illustrating the supplemental relative movement between the blank and the tool, that is required for undercut faces. The three fragmentary tooth sections can be considered as taken respectively along the lines 14—18, 15—19 and 16—20 of Figs. 1 and 8.

Figs. 14, 15 and 16 are diagrammatic views similar to Fig. 13 illustrating the blank and the tool relatively adjusted for the respective positions represented by the lines 14—18, 15—19 and 16—20.

Fig. 17 is a diagrammatic view similar to Fig. 13 but illustrating a different way of practicing the method.

Figs. 18, 19 and 20 are diagrammatic views similar to Fig. 17 illustrating the blank and the tool relatively adjusted for the respective positions indicated by the lines 14—18, 15—19 and 16—20.

Fig. 21 is a diagrammatic plan view of a machine adapted for practicing the invention.

Fig. 22 is a sectional view taken along the line 22—22 of Fig. 21.

Fig. 23 is a view showing a development of a cam of the machine shown in Figs. 21 and 22.

Figs. 24 to 26 are diagrammatic views illustrating the relationship of the former to cutters of different diameters.

In order that the method involving the invention may be clearly understood, I will first describe a cutter such as may be made in accordance therewith. Referring to the drawings, particularly to Figs. 1 to 3 thereof, it will be seen that I have shown a cutter D which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is non-radial, being inclined backward in order to provide an improved cutting angle. The cutting faces may be plane and parallel with the axis of the cutter, but it is preferable to incline them so that the longitudinal lines of each face lie at angles to the axis. Preferably, as shown, the entire teeth 1 are oblique or inclined, and not merely the front cutting faces 3 thereof, and each tooth 1 is generally helical in form and each cutting face 3 conforms to a helicoid. As illustrated in Figs. 1 and 2 the helicoid is one formed by a generatrix following a helix on a small cylinder concentric with the axis of the cutter and also following a helix on a much larger cylinder also concentric with the axis. The teeth and the cutting faces may be inclined in either direction with respect to the axis and the degree of inclination may be varied as required.

The cutter may be made for cutting any desired practical contour. The contour may be made up of a series of straight lines, or a series of circular arcs, or a combination of circular arcs and straight lines, or the contour may consist in whole or in part of non-circular curves. The cutter D shown in Figs. 1 and 2 is adapted for cutting the contour shown in Fig. 3, this contour consisting of a straight section 4 parallel with the axis, a concave section 5 in the form of a circular arc, a straight section 6 inclined with respect to the axis, a concave section 7 in the form of a circular arc, a convex section 8 in the form of an elliptical arc, a concave section 9 in the form of a circular arc, and a straight section 10 parallel with the axis. The grooves 2 can be of any usual or preferred depth or shape as required by the spacing and by the depth of the contour. As illustrated in Fig. 3, each groove 2 has a uniform depth throughout; that is, its bottom is at a uniform distance from the axis of the cutter.

The outer edge of each cutting face 3 has an outline which is shaped to cut the predetermined contour when the cutter is rotated, this outline of the cutting face following the non-radial and preferably helicoidal surface thereof. All points along the outline must be at their respective correct distances from the center so that when the cutter is rotated they will define the correct predetermined contour. This relationship of the several points along the outline of the cutting face obtains notwithstanding the fact that the cutting face is non-radial; and this relationship obtains notwithstanding the fact that the cutting face is or may be a warped or helicoidal surface as shown.

Each tooth of the cutter D is relieved along lines 11 extending backward and inward from the outline of the cutting face, these relief lines forming a continuous surface or continuous surfaces which extend from end to end of the cutter and which are properly constructed notwithstanding the variations in radius at different points along the said outline and notwithstanding the variations in angular position resulting from the non-radial and preferably warped or helicoidal cutting face. Preferably the relief lines 11 are maintained in similar relationship to each other as they extend backward and inward, the lines preferably conforming to spirals of Archimedes. The result is that each tooth of the cutter, at any axial plane of intersection, has a distorted shape, the distortion of shape resulting from the fact that the successive inward inclined relief lines 11 start at different angular positions partly because the cutting face is non-radial and partly because the cutting face is inclined with respect to the axis or helicoidal. Notwithstanding this distortion in shape at axial planes of intersection, the outline or effective contour at the cutting face is correct, as before stated.

When the relief lines 11 conform to spirals and are maintained in similar relationship as they extend backward and inward, as is preferred, it is possible to sharpen or grind the teeth of the cutter on the front cutting faces 3 without changing the effective contour. The teeth present the same effective contour at successive inclined surfaces of intersection similar in form and position to the initial cutting faces 3. At any surface, back of an initial cutting face 3 and similar to the said face, the same effective contour will be found. Therefore if the cutter is ground on the front faces to helicoids which are the same as the helicoids of the initial cutting faces the effective contour will remain the same.

With a relatively long contour such as that shown and with the teeth relatively closely spaced, overlapping occurs to a greater or less extent. The forward outer corner a of each tooth overlaps the opposite rear outer corner b of the next preceding tooth. This overlapping may be even greater than that shown when there is a longer contour, or when there is a greater degree of inclination, or when the teeth are more closely spaced.

The present invention relates to a method of making a cutter such as that set forth and this method will now be described. It will be understood that the preliminary steps of turning the blank and cutting the grooves therein can be carried on in any usual or preferred way, these not of themselves constituting any part of the invention. The invention relates particularly to the method of shaping the blank to properly form and relieve the undercut and preferably helical teeth so that they will cut a correct contour.

In practicing the method, use is made of a cutting tool which is fed along the blank following the contour thereof. This tool or cutter may be of any usual or preferred type, but I prefer and have illustrated a lathe tool S. For roughing out the blank a relatively broad tool may be used, but for finishing it is preferable to use a tool provided with a fine point. In this respect the procedure is the same as set forth in my aforesaid Patent No. 1,348,301. If desired, however, the procedure may be varied as set forth in my patent for methods of making milling cutters, No. 1,348,302, dated August 3rd, 1920.

In Figs 4 to 12 there is illustrated a cutter blank D' having helicoidal cutting faces, but for the sake of simplicity the teeth are shown without undercut. The tool S is held in operative relationship with the blank D' and is fed and guided, preferably toward the left, so as to follow the true contour 4—10. During the cutting operation the blank is axially rotated by any preferred means. The tool is preferably held in parallelism while being fed, and the feeding is preferably effected in a uniform manner from one end of the blank to the other and may be either continuous or intermittent. The tool is very narrow and the amount of feed for each revolution of the blank is less than the width of the tool. For guiding the tool S there is provided a former U having exactly the predetermined contour to be cut by the cutter D'. The former is engaged by a pin V which has the same or approximately the same front outline as the tool. The former pin is connected with the tool for longitudinal movement in unison therewith.

Figs 4 and 5 show the tool S in engagement with the blank, and the pin V in engagement with the former, the section 4 and a part of the section 5 of the predetermined contour having already been cut. Fig. 6 is a cross sectional view through the blank at the point of engagement of the tool S, the blank being in the position indicated in Figs. 4 and 5. The tool S is shown engaging the front edge of a tooth 1. In order that the teeth of the cutter may be properly relieved, the tool is reciprocated toward and from the blank axis in timed relation to the blank rotation. As illustrated in Fig. 6, the blank is rotated in the direction indicated by the arrow and the tool is reciprocated through an effective distance e, the tool being given one complete movement forward and backward for each tooth of the blank. As shown in Fig. 6, the tool is in its outer operative position and is about to move inward to cut the relief on the tooth which has just come into engagement with it. Fig. 7 is a view similar to Fig. 6 but showing the cutter advanced so that the tool S is at the rear of the tooth 1. It will be clear that the tool has moved inward to its inner operative position and in so moving has formed the proper relief 11 on the tooth.

Figs. 8 and 9 are views similar respectively to Figs. 4 and 5 but showing the tool S in a different position. It will be understood that the tool in moving from the position shown in Figs. 4 and 5 to the position shown in Figs. 8 and 9 has been fed very slowly and has been properly guided by the former U to cut the remainder of the section 5 of the predetermined contour, all of the sections 6 and 7, and a part of the section 8.

I have stated that the tool S is reciprocated in timed relation with the rotation of the cutter blank. This relation is definite and fixed if the cutting faces of the teeth are plane and parallel with the cutter axis; but when the cutting faces are inclined or helicoidal, as shown, the relationship must be varied to conform to the changing angular position of the outer edge of the cutting face, as the tool is fed longitudinally. Fig. 9 shows the cutter blank with the engaged tooth in the same position as in Fig. 5. On account of the inclination of the tooth the point of the tool is near the rear of the tooth instead of at the front thereof, as was shown in Figs. 5 and 6. If the same relation had been maintained between the rotation of the cutter blank and the reciprocation of the tool, the tool would be in the same outermost operative position which it occupied in Fig. 6, thus leaving it out of engagement with the blank, as shown in Fig. 10. Obviously, the relation between the cutting tool and the blank must be varied in order to enable the tool to cut the necessary relief and at the same time maintain the correct contour. When the front edge of the tooth reaches the point of the tool, the tool must engage the blank and must thereafter continue in engagement as the tooth continues to move past it. The required variation in the relationship may be effected by relatively accelerating the tool reciprocation in proportion to the movement of the tool along the blank, or it may be effected by relatively retarding the rotative movement of the blank. In either case the result is to maintain the tool and the cutter in the proper relationship as the tool is fed. The relation between the rotation of the blank and the reciprocating and relieving movements of the tool are continued and the relative timing is so varied that the tool always engages the front edge of the tooth when the tool is in the outer operative position, as shown in Fig. 11. As the blank rotates to the position shown in Fig. 9 the tool follows the correct relief line 11 to the position shown in Fig. 12.

As already stated I have shown the blank D' in Figs. 4 to 12 as provided with teeth having their front faces arranged exactly radially. However, in accordance with the present invention the blank may have undercut or non-radial faces. For cutting a blank D with non-radial faces, it is necessary to supplementally vary the ordinary relation between the relieving movements of the tool and the rotative movement of the blank as the cutting tool moves inward or outward to conform to different blank diameters. Therefore, when such a blank is to be cut, the relative movements heretofore described are somewhat modified.

In the diagrammatic Fig. 13, $t$ may be considered to be a fragmentary sectional view taken at the line 14—18 of Fig. 1 of a cutter D having undercut faces, the radius of the cutter at this position being $r$. Under the control of the former and the former pin, the cutting tool S is at a distance $r$ from the blank axis and is in position to engage the point of the tooth shown and cut the proper relief line 11 thereon. A tooth section taken at the line 15—19 of Fig. 1 is shown at $t'$, the radius at this position being $r'$. For this radius $r'$, without special provision being made, the tool S would be in the position indicated by dotted lines at the distance $r'$ from the blank axis. However, by reason of the inclined cutting face on the blank, the blank tooth would not be in engagement with the tool but would be separated therefrom by the angle $m'$. The tool, however, would immediately start its inward relieving movement notwithstanding the fact that the blank tooth has not yet reached it, and the result would be the cutting of an incorrect relief line 11'. A tooth section taken at the line 16—20 of Fig. 1 is shown at $t''$, the radius at this position being $r''$. For this still smaller radius $r''$, the result would be similar to that last described except that the point of the tooth would be separated from the tool by a greater angle $m''$, with the result that the incorrect relief line 11'' would be further from the correct relief line 11. In order to avoid the errors which would occur, as shown in Fig. 13, I vary the relationship between the relieving movements of the tool and the rotative movement of the blank.

As shown in Figs. 14 to 16 the relieving movements are varied in such a way that the tool, as concerns its relieving movements, is always in the same position when engaged by the front edge of the tooth. Fig. 14 shows the tool at the position 14—18 and at the distance $r$ as shown in Fig. 13. For this maximum radius no variation in position is necessary. Fig. 15 shows the tool at the position 15—19 and at the same radius $r'$ from the blank axis as was shown in Fig. 13; but the relation of the relieving movement has been so changed that the tooth is in position to be engaged by the point of the tool when the relieving movement starts. The tooth at $t'$ is therefore cut with the correct relief line 11. Similarly, Fig. 16 shows the tool at the position 16—20 and at the same distance $r''$ from the blank axis as was shown in Fig. 13; but the relation of the relieving movement has been so changed that the tooth is in position to be engaged by the point of the tool when the effective relieving movement starts. The tooth at $t''$ is therefore cut with the correct relief line 11. It will be seen that the operation, as illustrated in Figs. 14 to 16, is in no way effected by or dependent on the longitudinal inclination of the cutting faces. In other words, it is immaterial whether the cutting faces are helical or plane.

The required variations in the relationship between the relieving movements of the tool and the rotative movement of the blank can be brought about either by changing (usually advancing) the blank movement or by changing (usually retarding) the tool movements. I have found it simpler, to retard the tool movements, and this is particularly desirable when provision is made as herein contemplated for changing the blank movement (and not the relieving movements) to conform to helical teeth. Therefore in practicing the method as illustrated in Figs. 13 to 16, the relieving movements are retarded, the amount of retardation depending on the position of the cutting tool at various radii less than the maximum radius $r$. It will be understood that the retarding of the relieving movements is effected without changing the relative positions of the tool and former pin. The retardation at the various radii is such that the tool is always at the same position, as concerns its relieving movements, when it engages a tooth of the blank. In other words the retardation is exactly in proportion to the time required for the edge of the tooth to reach the plane in which the point of the tool reciprocates.

Another way of varying the relation between the relieving movements of the tool and the rotative movement of the blank to conform to undercut or non-radial cutting faces, will be understood by reference to the diagrammatic Figs. 17 to 20. In Fig. 17, $t$, $t'$ and $t''$ may be considered to be fragmentary sectional views at the positions 14—18, 15—19 and 16—20, of a cutter D having non-radial faces, the radii being $r$, $r'$ and $r''$ respectively. As shown in Fig. 17, for the position $t$ the cutting tool S is held at a distance $r$ from the center of the cutter D. For a smaller radius such as $r'$ or $r''$ without special provision being made, the tool S would be in a position at the radius $r'$ or the radius $r''$ from the blank. The tool would immediately start its inward relieving movement notwithstanding the fact that the blank tooth had not yet reached it, and the result would be the cutting of an incorrect relief line 11' or 11''. When using the procedure illustrated in Figs. 14 to 16, this error is avoided by retarding the relieving movement of the tool. In acordance with the different procedure now to be described, the relieving movements of the tool are not changed as to time but are changed as to position or as to the limits of movement.

In lieu of the former U ordinarily used, there is provided a special former W or W'. This former W or W' instead of being provided with a vertical guide surface, is provided with a surface of revolution constructed about a center $x$ and having the desired contour at any axial plane. The surface of revolution is such that the several radii thereof are the same as the corresponding radii of the cutter D to be formed. As shown in Fig. 17, the former W' is provided with an undercut surface $y$ which is at the same angle as the undercut tooth faces of the cutter D. Cooperating with the former W' is a former pin Z of special form. At any horizontal plane the former pin Z has the same cross sectional shape as the tool S, but the former pin is curved rearward at points above the level of the center $x$ of the former.

A former such as W' illustrated diagrammatically in Fig. 17 would not be entirely practical for the reason that the upper part of the former pin would interfere with the former at places above the inclined surface $y$. A simpler and more practical former W is shown in Figs. 18 to 20. It will be seen that the former W is the same in principle as the former W' but that the body thereof is below the surface $y$ instead of above it. This eliminates any interference with the curved part of the former pin Z.

For the tooth at $t$, as shown in Fig. 18, the tool is at the radius $r$. For this maximum radius no variation in position is required. For the tooth at $t'$ as shown in Fig. 19, the tool S, instead of being allowed to take a position at the radius $r'$, is caused to take a position at a radius which is greater by the distance $s'$. The distance $s'$ is such that the inward relieving movement of the tool, which starts immediately, will enable the tool to properly engage the tooth section $t'$ and properly cut the desired relief line 11 thereon. The tool S is held at the increased radius $r'+s'$ because of the peculiarly curved shape of the former pin Z at its upper part. The former pin engages the edge of the former at a point along the inclined surface $y$, the point of engagement being at a higher elevation because of the inclination. The curvature is such that the vertical part of the pin is held at a distance $r'+s'$ from the center $x$ of the former. Similarly, at the radius $r''$ for the tooth at $t''$ the tool S, instead of being allowed to take a position at the radius $r''$ from the center, is caused to take a position at a radius which is greater by the distance $s''$. The distance $s''$ is such that the inward relieving movement of the tool which starts immediately, will enable the tool to engage the tooth section $t''$ and properly cut the desired relief line 11 thereon. The increased radius $r''+s''$ is obtained by reason of the aforesaid curvature of the upper part of the former pin Z. This curved part of the pin engages the former at another point along the inclined surface $y$, this point being nearer the center and therefore at a higher elevation.

It will be seen that, when the cutting faces are heliocidal as well as undercut, two independent variations are effected in the relation between the relieving movements of the tool and the rotative movement of the blank.

One of these variations is dependent upon the longitudinal movements of the tool along the blank and the other of the variations is dependent upon the inward or outward movement of the tool whereby the blank is cut with different diameters. Preferably, as already stated, the first said variation is effected by changing the rotative movement of the blank and the second variation is effected by changing the relieving movements of the tool. It will be understood, however, that the invention is not limited to this exact procedure, as other ways for effecting the required variations in the relationship would be within the scope of the invention.

Figs. 21 to 23 illustrate the essential parts of a machine for carrying out the process as presented in Figs. 4 to 20. This machine is not claimed as a part of the present invention, and in fact so far as this invention is concerned the machine construction can be widely varied. I preferably make use of machines such as shown in my copending application for relieving machines, Serial No. 286,524 filed March 31st, 1919, and Figs. 21 to 23 can be understood as illustrating the said machine diagrammatically.

As illustrated, 12 is a mandrel upon which is carried a cutter blank D. Suitable means are provided for supporting and rotating the mandrel. Longitudinally movable along ways 13, 13 is a carriage 14 upon which is mounted a transversely movable slide 15. Carried by the slide 15 is an independently movable transverse slide 16 which carries the tool S, there preferably being an intermediate slide 17 by means of which preliminary adjustments may be effected. Secured to the slide 15 is the aforesaid former pin V the shape of which, in horizontal cross sectional outline, corresponds to that of the tool S, preferably being exactly the same. Secured to the main frame of the machine is the former U which has a contour 4—10 which is exactly the same as the desired effective contour of the finished cutter. A spring 18 is provided for pressing the slide 15 toward the rear and thus holding the former pin V always in engagement with the former U. It will be seen that when the carriage 14 is moved longitudinally the slide 15 will be caused to move transversely under the guidance of the former, the tool S thus being caused to follow an outline which is exactly the same as that of the former U.

Mounted on the carriage 14 and on the transversely movable slide 15 is a suitable mechanism for reciprocating the slide 16 to effect the relieving movements of the tool. Rotatably mounted in a bearing on a bracket 19 carried by the slide 15 is a longitudinal shaft 20 which carries a cam 21. Pivoted to the slide 15 is a lever 22, which at its lower end engages the cam 21 and which at its upper end engages the slide 15. A spring 23 serves to hold the slide 16 in engagement with the lever. It will be seen that when the shaft 20 and the cam 21 are rotated the lever 22 will be oscillated, thus reciprocating the slide 16 and the tool S. For rotating the shaft 20 and the cam 21 there is provided a longitudinal shaft 24 which is rotated in any suitable way. Splined on the shaft is a worm 25 which is movable longitudinally with the carriage 14. Mounted on the carriage is a transverse horizontal shaft 26 carrying a worm wheel 27 which meshes with the worm 25. Slidably mounted on the shaft 26 is a bevel gear 28 which meshes with a bevel gear $28^a$ on the shaft 20. The bevel gear 28 is engaged by the bracket 19 and is thus held in mesh with the bevel gear $28^a$ as the slide 15 and the parts connected therewith move transversely. The shaft 24 is driven in proper timed relationship with the spindle so that normally, for any given position of the carriage, the cam 21 is given as many complete revolutions for each revolution of the blank as the blank has teeth.

In order that the relieving movements of the tool S may be varied in accordance with the helicoidal cutting faces on the blank, I preferably provide means for supplementally rotating the blank in proportion to the longitudinal movement of the tool. As illustrated, the mandrel 12 is engaged by a chuck 29 on a spindle 30. Power for rotating the spindle is supplied through a sleeve 31 which has splined engagement with a smaller sleeve 32. A rod 33 and a forked lever 34 are provided for causing the sleeve 32 to move longitudinally with the carriage 14. The spindle 30 is fixed against longitudinal movement and extends into the sleeve 32. The sleeve 32 is provided with a helicoidal slide 35 having the same longitudinal pitch as the helicoidal cutting faces of the blank. A pin 36 on the spindle 30 projects into the slide 35, thus transmitting power from the sleeve 32 to the spindle. It will be seen that the construction permits the spindle to be driven by means of the sleeve 31, but that the spindle is supplementally rotated in proportion to the longitudinal movement of the carriage and the cutting tool. This supplemental movement is just sufficient to enable the tool to properly engage the helicoidal teeth, as fully explained in connection with the diagrammatic Figs. 8 to 12.

In order that the relieving movements of the tool may be properly retarded, as described in Figs. 13 to 16, the bevel gear 28 is connected with the shaft 26 by means of inclined cam grooves 37, illustrated in Figs. 22 and 23. The gear is provided with pins 38 which enter these grooves. With the pins 38 in the full line position shown, which corresponds to the radius $r$, as illustrated in Fig. 14, the cam 21 is in position to normally start the inward relieving movement of the tool. It will be recalled that for any given longitudinal position of the tool the cam is ordinarily rotated at a speed exactly in proportion to the rotative movement of the spindle and blank. When the tool is moved inward to a position corresponding to the radius $r'$, the normal rotative movement of the cam is retarded to an amount represented by the angular distance $n'$, and which corresponds to the angle $m'$ shown in Fig. 13. When the tool moves still further inward to a position corresponding to the radius $r''$, the cam is still further retarded by an amount represented by the angular distance $n''$ which corresponds to the angle $m''$ shown in Fig. 13. The result of this retarding of the tool is to cause it to be always in the same position as concerns its relieving movements when the front edge of the tool reaches it.

The fact that the blank may not have the assumed maximum radius $r$ is immaterial provided that the bevel gear 28 is made to take the proper positions along the cam shaft 26. In order that this may be conveniently brought about, the former is preferably constructed so as to correspond to the radius of the blank to be cut. If the cutter D is to have a maximum radius $r$, a former $U^a$ is made with the point of maximum radius at a distance $r$ from a given reference line. If a cutter E is to be made having a radius $r'$, then a former $U^e$ is made with the point of maximum radius at the distance $r'$ from the reference line. If a cutter F is to be made having a maximum radius $r''$, then a former $U^f$ is made with its point of maximum radius at the distance $r''$ from the reference line. The construction of the formers in the way described insures the location of the sliding gear 28 on the shaft 26 at positions corresponding exactly to the different radii of the blanks.

When the method illustrated in Figs. 17 to 20 is to be used, the machine is modified by substituting straight splines for the cam grooves 37, and the special former W and former pin Z already described are put in place.

What I claim is:

1. The herein described method of shaping a spirally relieved milling cutter having non-radial cutting faces, the method consisting in axially rotating a blank having teeth with non-radial front faces, in providing a cutting tool in position to cut the blank, in guiding the tool to cut the blank with different diameters, in reciprocating the tool in timed relation to the rotation of the blank to provide the required relief, and in varying the relieving movements of the tool in conformity with the non-radial tooth faces.

2. The herein described method of shaping a spirally relieved milling cutter having non-radial cutting faces and adapted to cut a predetermined contour other than a straight line, the method consisting in axially rotating a blank having teeth with non-radial front faces, in providing a cutting tool in position to cut the blank, in guiding the tool to follow the said contour, in reciprocating the tool in timed relation to the rotation of the blank to provide the required relief, and in varying the relieving movements of the tool in conformity with the non-radial tooth faces.

3. The herein described method of shaping a spirally relieved milling cutter having non-radial helicoidal cutting faces, the method consisting in axially rotating a blank having teeth with non-radial front faces, in providing a cutting tool in position to cut the blank, in guiding the tool to cut the blank with different diameters, in reciprocating the tool in timed relation to the rotation of the blank to provide the required relief, and in varying the relieving movements of the tool in accordance with the changes in diameter of the blank, thereby conforming to the non-radial tooth faces.

4. The herein described method of shaping a spirally relieved milling cutter having non-radial cutting faces, the method consisting in axially rotating a blank having teeth with non-radial front faces, in providing a cutting tool in position to cut the blank, in guiding the tool to cut the blank with different diameters, in reciprocating the tool in timed relation to the rotation of the blank to provide the required relief, and in varying the relieving movements of the tool in proportion to the angle between a radial line through the edge of the tooth face at the point of cutting and a predetermined relatively fixed radial line.

5. The herein described method of shaping a spirally relieved milling cutter having non-radial cutting faces, the method consisting in axially rotating a blank having teeth with non-radial front faces, in providing a cutting tool in position to cut the blank, in guiding the tool to cut the blank with different diameters, in reciprocating the tool in timed relation to the rotation of the blank to provide the required relief, and in varying the relieving movements of the tool in accordance with the changes in diameter of the blank, thereby conforming to the non-radial tooth faces.

6. The herein described method of shaping a spirally relieved milling cutter having non-radial cutting faces, the method consisting in axially rotating a blank having teeth with non-radial front faces, in providing a cutting tool in position to cut the blank, in guiding the tool to cut the blank with different diameters, in reciprocating the tool in timed relation to the rotation of the blank to provide the required relief, and in changing the timing of the relieving movements of the tool in accordance with the changes in diameter of the blank, thereby conforming to the non-radial tooth faces.

7. The herein described method of shaping a spirally relieved milling cutting having non-radial cutting faces, the method consisting in axially rotating a blank having teeth with non-radial front faces, in providing a cutting tool in position to cut the blank, in guiding the tool to cut the blank with different diameters, in reciprocating the tool in timed relation to the rotation of the blank to provide the required relief, and in retarding the relieving movements of the tool in accordance with the changes in diameter of the blank, thereby conforming to the non-radial tooth faces.

8. The herein described method of shaping a spirally relieved milling cutter having non-radial helicoidal cutting faces, the method consisting in axially rotating a blank having teeth with non-radial helicoidal front faces, in providing a cutting tool in position to cut the blank, in guiding the tool to cut the blank with different diameters, in reciprocating the tool in timed relation to the rotation of the blank to provide the required relief, and in varying the relieving movements of the tool in conformity with the non-radial helicoidal tooth faces.

9. The herein described method of shaping a spirally relieved milling cutter having non-radial helicoidal cutting faces and adapted to cut a predetermined contour other than a straight line, the method consisting in axially rotating a blank having teeth with non-radial helicoidal front faces, in providing a cutting tool in position to cut the blank, in guiding the tool to follow the said contour, in reciprocating the tool in timed relation to the rotation of the blank to provide the required relief, and in varying the relieving movements of the tool in conformity with the non-radial helicoidal tooth faces.

10. The herein described method of shaping a spirally relieved milling cutter having non-radial helicoidal cutting faces, the method consisting in axially rotating a blank having teeth with non-radial helicoidal front faces, in providing a cutting tool in position to cut the blank, in guiding the tool to cut the blank with different diameters, in reciprocating the tool in timed relation to the rotation of the blank to provide the required relief, and in varying the relieving movements of the tool in accordance with the changes in diameter of the blank and in accordance with the longitudinal movement of the tool, thereby conforming to the non-radial helicoidal tooth faces.

11. The herein described method of shaping a spirally relieved milling cutter having non-radial cutting faces, the method consisting in axially rotating a blank having teeth with non-radial front faces, in providing a cutting tool in position to cut the blank, in guiding the tool to cut the blank with different diameters, in reciprocating the tool in timed relation to the rotation of the blank to provide the required relief, in varying the relation between the relieving movements of the tool and the rotative movement of the blank in accordance with the changes in diameter of the blank, thereby conforming to the non-radial tooth faces, and in further varying the relieving movements of the tool in proportion to the longitudinal movement of the tool, thereby conforming to the helicoids.

12. The herein described method of shaping a spirally relieved milling cutter having non-radial helicoidal cutting faces, the method consisting in axially rotating a blank having teeth with non-radial helicoidal front faces, in providing a cutting tool in position to cut the blank, in guiding the tool to cut the blank with different diameters, in reciprocating the tool in timed relation to the rotation of the blank to provide the required relief, in independently varying the relieving movements of the tool and the rotative movement of the blank, one of the said variations being in accordance with the changes in diameter of the blank and the other in accordance with the longitudinal movement of the tool, thereby conforming to the non-radial helicoidal tooth faces.

13. The herein described method of shaping a spirally relieved milling cutter having non-radial helicoidal cutting faces, the method consisting in axially rotating a blank having teeth with non-radial helicoidal front faces, in providing a cutting tool in position to cut the blank, in guiding the tool to cut the blank with different diameters, in reciprocating the tool in timed relation to the rotation of the blank to provide the required relief, in varying the relieving movements of the tool in accordance with the changes in diameter of the blank, thereby conforming to the non-radial tooth faces, and in varying the rotative movement of the blank in proportion to the longitudinal movement of the tool, thereby conforming to the helicoids.

14. The herein described method of shaping a spirally relieved milling cutter having non-radial helicoidal cutting faces, the method consisting in axially rotating a blank having teeth with non-radial helicoidal front faces, in providing a cutting tool in position to cut the blank, in guiding the tool to cut the blank with different diameters, in reciprocating the tool in timed relation to the rotation of the blank to provide the required relief, in changing the timing of the relieving movements of the tool in accordance with the changes in diameter of the blank, thereby conforming to the non-radial tooth faces, and in varying the rotative movement of the blank in proportion to the longitudinal movement of the tool, thereby conforming to the helicoids.

In testimony whereof, I hereto affix my signature.

FRIEDERICH MÜLLER.